Patented Jan. 28, 1936

2,028,970

UNITED STATES PATENT OFFICE 2,028,970

PROCESS OF PRESERVING FRUIT AND VEGETABLES

Will H. Ewell, Los Angeles, Calif.

No Drawing. Application December 1, 1933, Serial No. 700,569. Renewed July 29, 1935

3 Claims. (Cl. 99—8)

My invention relates to a process of preserving fruits and vegetables and is especially intended for use in preserving pears, apricots, peaches, and especially apples.

Enormous quantities of sliced apples are used in bakeries for making apple pies and in hotels and restaurants for making apple sauce and in other dishes and pastries. Apples when sliced and exposed to the atmosphere will darken or turn black due to oxidation. Such darkened apples are unsuitable for pies, apple sauce, and other culinary purposes and, therefore, it has been the practice to treat the sliced apples prior to their delivery to the bakeries, hotels, and restaurants, with a bleaching agent, such as sulphur dioxide which would, to a large extent, restore the original light color of the sliced apples. There is a serious objection to the use of sulphur dioxide for the reason that the fumes are disagreeable and noxious to the operators and if used in excess the sulphur may be tasted in the apples which, of course, is highly objectionable.

I have discovered a new method of preserving the sliced apples in practically their original light color by means of an agent which does not combine with the apple slices, is odorless and tasteless, non-poisonous, and which depends not on any bleaching action but on the prevention of the access of the atmosphere to the sliced apples by enveloping the same with a non-oxidizing gas, such as carbon dioxide.

In particular, my invention contemplates the use of water which is kept close to the freezing point and through which minute bubbles of carbon dioxide are caused to pass thereby charging the water with a maximum amount of carbon dioxide at ordinary atmospheric pressure. The sliced apples are placed in the water for a short time and later removed, packed in air tight containers, and delivered to the places of consumption.

With the above and other objects in view, which will appear as the description proceeds, my invention consists in the steps of the process hereinafter described and claimed.

Apples, after being peeled and cored, are sliced preferably by a slicer cutting the same into radial slices, the size of the slices depending upon the size of the apple, the largest apples being cut into sixteen slices. The slices are placed immediately, in order to prevent any oxidation, into a container of cold water saturated with carbon dioxide. A suitable apparatus may be made of a container having a false bottom, the false bottom being either perforated with a large number of perforations or consisting of a series of slats spaced from each other a small distance. Under the false bottom is a cooling coil of any preferred construction keeping the water in the container cool, and close to the freezing point. Another coil is placed under the false bottom provided with minute spaced perforations to which carbon dioxide is pumped under pressure, a valve controlling the amount of carbon dioxide caused to bubble through the water.

The sliced apples are allowed to remain in the cold water saturated with carbon dioxide as described for a minute or two. During this short space of time a small amount of water is absorbed by the slices of apples due to osmosis. This is an important feature of the invention, as will be explained shortly. The slices are now removed and placed on a suitable drain board to drain off any excess water and are then placed in suitable containers lined with paraffined or oiled paper. I prefer to use the wooden boxes in which apples are customarily shipped and line them with oiled paper and pack the slices of apples tightly so that little or no air spaces will remain in the mass of the sliced apples. The oiled paper is folded over the top so that for all practical purposes the slices of apples are in an air tight container after the lids have been nailed on the boxes. The containers filled with sliced apples are now placed in cold storage and delivered to the bakeries, hotels, and restaurants as required.

The small amount of water charged with carbon dioxide which has been absorbed by the sliced apples serves a useful function during the handling of draining and packing and transportation. Carbon dioxide will be slowly given off, forming a protecting envelope of carbon dioxide gas about the individual slices of apple or about the whole mass itself. In this manner the air is prevented access to the sliced apples and discoloration and oxidation is avoided.

As a modification of the process above described my improved method of preserving sliced apples also contemplates the immersion of the peeled and cored apples in cold water charged with carbon dioxide prior to the slicing operation. This is a matter of convenience for in the peeling and coring of apples it is still necessary to trim some of the apples individually before the slicing and for that reason it is a convenience to place the peeled and cored apples into a container of cold water charged with carbon dioxide from which they are removed to the slicing machines as required.

It will be appreciated that during the coring and peeling operation the apples are subject to a slight amount of discoloration due to the access of air although the time required for peeling and coring the apples is only a matter of seconds. For this purpose it may be advisable to add a small quantity of sulphur dioxide to the water of approximately five percent of the volume of carbon dioxide used. Sulphur dioxide, as well known, is a bleaching agent and will remove any discoloration that may have taken place during the peeling and coring operation. The amount of sulphur dioxide, however, is so small that it is not objectionable in the handling nor will it affect the flavor or taste of the apples.

It will be appreciated that the object of the process is to prevent oxidation of the apples and, therefore, any other gas which is chemically inert toward the apples may be used or carbon dioxide by itself without any water may be supplied to a container in such quantities as to continually overflow the same. However, I have found that the process is much more convenient by the use of carbon dioxide charged water which also is preferable on account of the small amount of carbon dioxide which is absorbed by the slices of apples and which later on generate the protective inert gas while the slices of apples are being packed in the containers and during their transportation to places of consumption.

While the invention is primarily directed to the preservation of apples it will be obvious that it is of general application and may be used with any fruits or vegetables which are subject to discoloration due to the access of air.

Various changes may be made by those skilled in the art in the steps of the process without departing from the spirit of my invention as claimed.

I claim:

1. The process of preserving fruit and vegetables subject to discoloration on exposure to air comprising cutting the fruit or vegetables into slices, immersing the slices in water saturated with carbon dioxide, removing the slices from the water and draining the excess water therefrom, and packing the slices tightly in an impervious envelope.

2. The process of preserving fruit and vegetables subject to discoloration on exposure to air comprising cutting fruit or vegetables into slices, immersing the slices in cold water saturated with carbon dioxide until the slices have absorbed a slight amount of carbon dioxide charged water, removing the slices and draining the excess water therefrom, and packing the slices tightly in substantially air tight containers.

3. The process of preserving fruit and vegetables subject to discoloration on exposure to air comprising cutting the fruit or vegetables into slices, immersing the slices in cold water saturated with carbon dioxide and containing about five percent of sulphur dioxide as compared with the volume of carbon dioxide until the slices have absorbed a slight amount of carbon dioxide charged water, removing the slices and draining the excess water therefrom, and packing the slices tightly in substantially air tight containers.

WILL H. EWELL.